April 8, 1958 F. UNGERER 2,829,565
SHEET METAL WORKING MACHINE
Filed Sept. 25, 1953 2 Sheets-Sheet 1

INVENTOR
Fritz Ungerer
By
Young, Emery + Thompson
Attys.

April 8, 1958   F. UNGERER   2,829,565
SHEET METAL WORKING MACHINE
Filed Sept. 25, 1953   2 Sheets-Sheet 2

INVENTOR
Fritz Ungerer
By Young, Emery & Thompson
Attys.

United States Patent Office 2,829,565
Patented Apr. 8, 1958

2,829,565
SHEET METAL WORKING MACHINE

Fritz Ungerer, Pforzheim-Brotzingen, Germany

Application September 25, 1953, Serial No. 382,430

2 Claims. (Cl. 90—24)

This invention relates to a sheet metal working machine, particularly for sheet plates made of non-iron metals.

Heretofore, it has been the usual practice to guide sheet metal plates which are to be worked into milling machines by means of pressure rollers so that they can be cut and shaved on one side. The usual width of the sheet plates required very large and expensive milling cutters so that for this reason alone only one cutter operated against a counter pressure roller. One required two particular machines which required considerable space and two operators to handle the plates.

It is an object of this invention to combine an apparatus for directing and guiding a plate and a machine for cutting and working the upper surface of the plate, as for instance a milling or planing cutter device, into one and the same machine.

A further object of the invention is to provide a machine in which the directing device is at the same time the device for feeding the work to be shaved or cut. The plate to be cut and worked is drawn or pushed through the machine at the same time that it is held and milled during its travel through the apparatus.

Another object of the invention resides in the provision of a machine in which there are a plurality of guiding and feeding rollers, both before the cutting zone and in back of the cutting zone.

A still further object of the invention consists in the specific structure of the milling cutters in which both surfaces, front and back surfaces, may be simultaneously cut. Such cutters are preferably in the form of chain cutters in which the cutting tools are mounted in a chain.

Another object of the invention is to cut both surfaces at the same time and at exact opposite points or lines on the plate or sheet to be worked. It is thus possible to eliminate the specific abutment or roller which is necessary when only one surface is worked, which required a support for the unworked side.

Further objects will be apparent from the following description when considered in connection with the accompanying drawings, in which.

Figure 1:
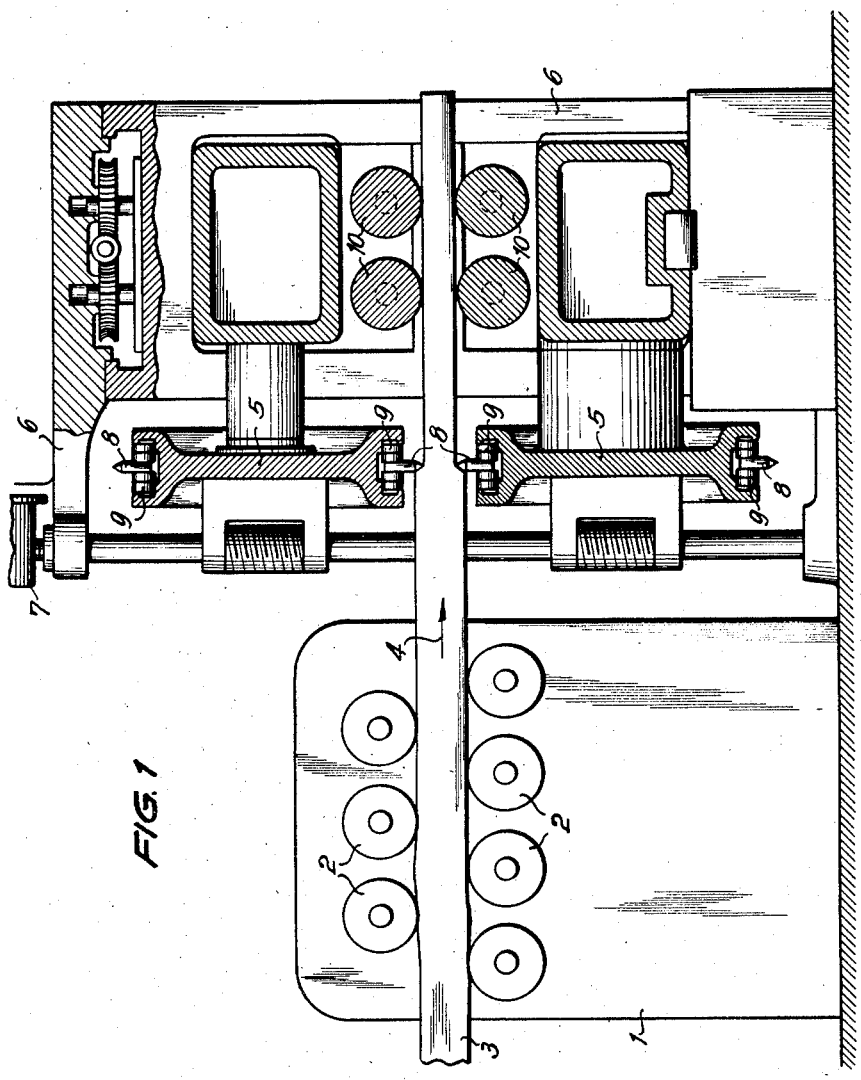
Figure 1 is a side elevation partly in section showing a preferred form of the invention.

The levelling or guiding device 1 which also is a feed arrangement is provided with, for example, seven guide rollers 2 which are mounted so that they can be adjusted toward or away from each other. The sheet metal plate 3 to be worked will be held and guided by the rollers 2 and at the same time moved to the right in the direction of the arrow 4, Fig. 1. The two chain sprocket wheels 5, which are rotatably mounted in the machine frame 6, are driven by the electric motor 7 and carry the chains 9, which latter are provided with a plurality of cutting tools 8. Behind the cutting chains, that is to the right in Fig. 1, there are provided two pairs of guide or conveying rollers 10 for the sheet metal plate 3. These rollers 10 are pressed toward each other by springs (not shown), and they take over the further movement of the plate 3 after being cut by the cutting tools. The chain sprocket wheels 5 and the conveying rollers 10 are adjustable to accommodate different depths of cut to be made into the plate. The rollers 10 can also be provided as guide rollers, if desired, so that the guide device 1 with the levelling rollers 2 may form a part of the machine combined with frame 6, having thus two sets of roller groups. When during the cutting of the upper surface of the plate new forces are present, then the second set of rollers direct the plate correctly and accurately through the machine.

Figure 2:
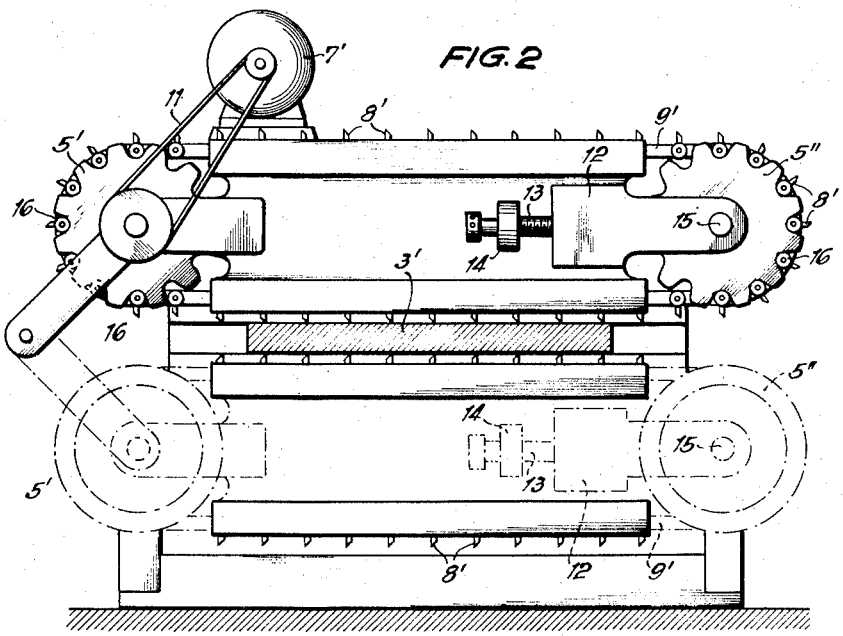
Fig. 2 is an end elevation of the machine of Fig. 1.
Figure 3:
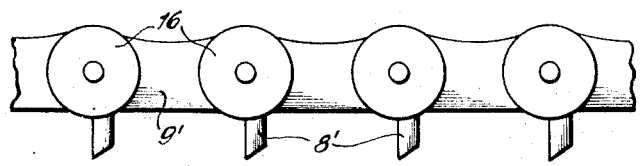
Fig. 3 is a side view of a part of one of the cutting or milling chains on an enlarged scale.
Figure 4:
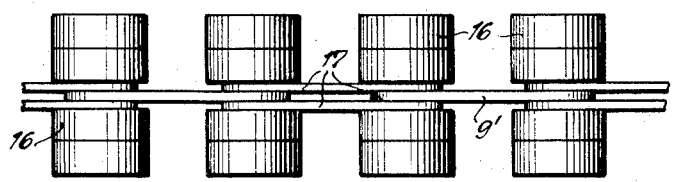
Fig. 4 is a plan view of the milling chain cutter of Fig. 3.

In the construction according to Fig. 2, the chain wheels 5' are driven counterclockwise by the motor 7' by means of a cable belt 11. The chains 9' which are provided with steel cutters 8' which cut the metal plate 3' are tensioned by means of a tensioning device 12. The latter is adjustable by means of a setting spindle 13 whereby by rotating the spindle by means of the setting wheel 14, the shaft 15 of the chain wheel 5", Fig. 2, will be moved to the right or left, whereby the chain 9' will be tensioned or loosened respectively.

The chain 9' is provided with rollers 16 which cooperate with the teeth of the sprocket wheels 5' and 5" to drive the chain 9'. The individual links 17 of each chain are easily removable so that the cutting tools 8' may be removed and replaced. As tool members, it is possible to use cutting heads having rotary axes which are vertical to the plane of the sheet metal, that is, carrying members with interchangeable steel tools which are capable of simultaneously working both sides of the sheet metal without the necessity of utilizing counter pressure members.

I claim:

1. A machine for planing the surface of an elongated sheet comprising a plurality of spaced rollers forming a feed path for the longitudinal advancement of a sheet, said rollers having their axes transversely of the path and in a common plane for guiding the sheet along the path, an endless chain, means mounting the chain for operation transversely of said path and with one run of the chain spaced above the rollers and of a length greater than the width of a strip to be planed, a plurality of planing cutters on said chain, and means to operate the chain, said one run of the chain presenting said cutters in cutting relation to the sheet.

2. A machine according to claim 1, in which there are included a second endless chain, means mounting said second chain for operation transversely of said path and with one run of the second chain spaced below the plane of the top of said rollers and of a length greater than the width of a strip to be planed, a plurality of planing cutters on said second chain when presented by said one run projecting above the plane of the top of said rollers into cutting relation to the sheet, and means to operate said second chain.

References Cited in the file of this patent

UNITED STATES PATENTS

| | | |
|---|---|---|
| 939,438 | Nielsen | Nov. 9, 1909 |
| 1,179,792 | Ballou | Apr. 18, 1916 |
| 1,503,996 | Perkins | Aug. 5, 1924 |
| 2,054,335 | Nelson | Sept. 15, 1936 |
| 2,181,185 | Ives | Nov. 28, 1939 |
| 2,384,164 | Gerung | Sept. 4, 1945 |
| 2,503,476 | Glover | Apr. 11, 1950 |
| 2,602,378 | Morton | July 8, 1952 |
| 2,661,940 | Rollins | Dec. 8, 1953 |